April 29, 1969     T. V. McNAMARA     3,441,117
MESHING ASSISTING MEANS FOR JAW CLUTCHES
Filed Aug. 5, 1966
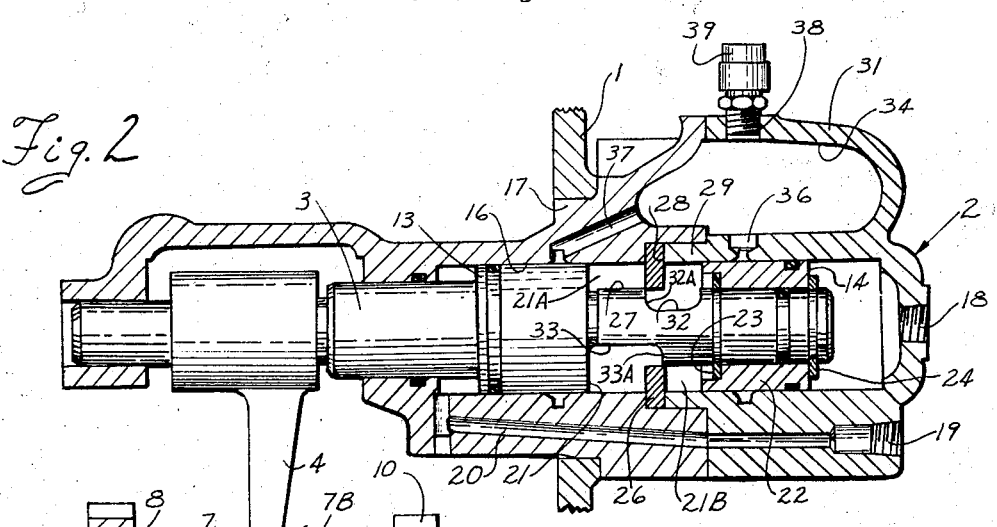
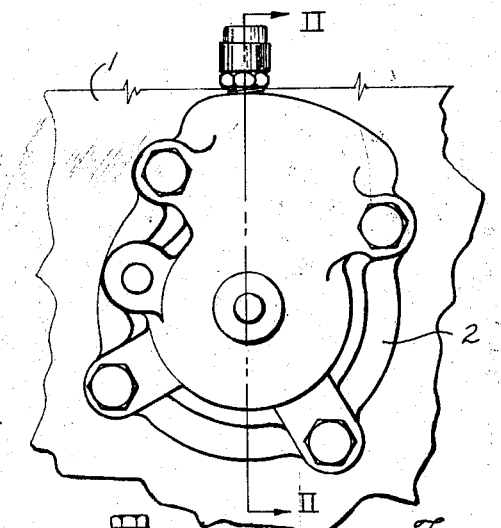
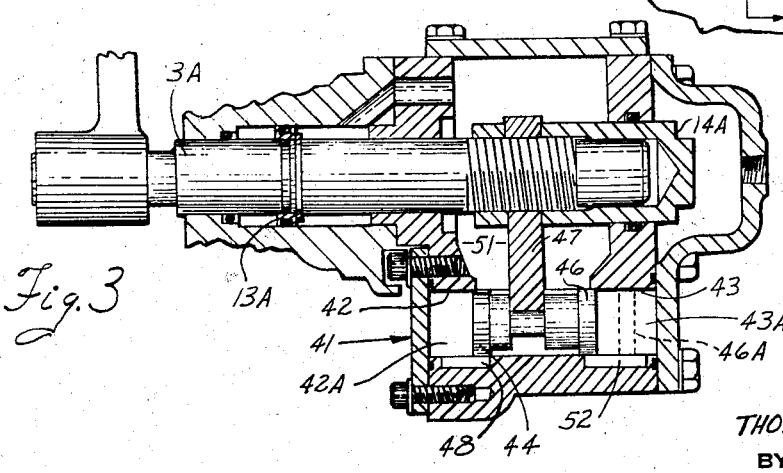
INVENTOR.
THOMAS V. McNAMARA
BY
Woodhams, Blanchard and Flynn
ATTORNEYS United States Patent Office 3,441,117
Patented Apr. 29, 1969

3,441,117
MESHING ASSISTING MEANS FOR JAW CLUTCHES
Thomas V. McNamara, Kalamazoo, Mich., assignor to Eaton Yale & Towne Inc., Cleveland, Ohio, a corporation of Ohio
Filed Aug. 5, 1966, Ser. No. 570,583
Int. Cl. F16h 5/14
U.S. Cl. 192—109   12 Claims

ABSTRACT OF THE DISCLOSURE

A device for assisting the intermeshing of a pair of power shifted interengageable jaw clutch teeth having check means slowing the movement of said jaw clutch teeth toward each other in response to the power shifting ahead of, but close to, the point of actual face-to-face contact of the jaw clutch teeth with respect to each other while permitting same to continue approaching each other and means de-activating said check means for permitting the resumption of free powered movement of said teeth into interengagement with each other.

---

This invention relates to meshing assisting means for jaw clutches and particularly to a type thereof for preventing the engagement of jaw clutch elements that are too far out of synchronism and for minimizing the likelihood of the respectively rotating interengageable teeth striking each other face-to-face at the time of an attempted interengagement and bouncing back away from each other.

Power actuated jaw clutches are commonly used in change gear transmissions, particularly in transmissions for trucks and off-the-highway vehicles, such as earth movers and the like. It has been observed that unsynchronized power actuated jaw clutches frequently engage even though the clutch parts are several hundred r.p.m. out of synchronism. This happens when the rate of axial movement of the axially movable jaw clutch part is sufficiently rapid to cause partial or full engagement of the clutch parts during the interval of time required for the relative angular movement of the jaw clutch parts, which are turning at different r.p.m.'s, to traverse the clearance or backlash in the clutch parts. That is, jaw clutch parts are manufactured so that the spaces between adjacent teeth on one clutch part are wider than the teeth on the other part so that the teeth can move axially freely and to provide manufacturing tolerance. If the movable clutch part is moved axially sufficiently fast, its teeth can at least partially enter between the teeth of the other clutch part, even though the clutch parts are substantially out of synchronism, because of this clearance or backlash. There will be a time interval between the time a tooth on one clutch part moves from a position in which it interferes with a tooth on the other part and the time it moves to a position in which it interferes with the next following tooth on the other clutch part. During this time interval, the length of which is dependent on the relative rate of angular movement of the clutch parts, the teeth on the clutch parts are capable of engaging and they can at least partially engage if the movable clutch part is moved axially fast enough even though the clutch parts are not rotating in synchronism. A manually shiftable clutch part is not usually moved this fast but in appropriate cases a power actuated clutch part can move this fast. This premature clutch engagement causes roughness in the shifting of the transmission and can place severe strains on the clutch parts.

Further, in the interengagement of jaw clutch teeth where same are moved into contact with each other under conditions of nonsynchronous speeds, synchronized, and then moved into engagement with each other, there has long been recognized the additional problem of their sometimes striking each other face-to-face and bouncing back away from each other. The force permitting the interengagement of said jaw clutches then tends to urge same toward each other again which may again result in another striking and bouncing back away from each other. This process may be repeated several times and will result in considerable noise, vibration, as well as severe wear on the teeth of such jaw clutches.

In an attempt to combat these recognized problems, various forms of synchronizers have been provided in which the teeth of the jaw clutches are held away from contact with each other while said jaw clutches are brought into synchronism, or substantial synchronism, after which the approach toward each other is resumed and interengagement effected. This system is satisfactory from an operational standpoint, but it requires the use of separate synchronizing devices which create extra and long recognized problems of manufacturing, installation and maintenance expense, as well as the additional problem of space requirement. Other attempts to meet the problem above mentioned have involved the use of various kinds of blockers or blocking rings, and these likewise are effective under certain circumstances. However, the shifting teeth can bounce back from blocker teeth as well as from clutch teeth and thereby still create noise and vibration. Further, since blockers, like synchronizers, do not permit actual interengagement of the clutch teeth during a synchronizing operation there sometimes arise conditions of very rapid rates of change of speed such that even though a synchronous condition exists when the signal is given for the shifting operation to resume, it may be lost by the time the teeth actually commence interengagement. Attempts to meet this latter problem have included devices for anticipating synchronization and resuming the shifting operations slightly ahead of the attainment of actual synchronization. However, this requires extremely complex devices and, while operationally effective, it is expensive, complex, space consuming, and often raises as many problems as it solves.

However, in working with this subject, I have found that an effective and satisfactory shift can be obtained if the respective sets of teeth of a jaw clutch are cut at a sharp angle with respect to the rotative axis of said clutch elements and same is power shifted in association with a checking device of such nature that the motion causing interengagement of the clutch elements is momentarily checked before same come into light contact with each other and then resumed just before a slight interengagement is attained. Thus, the axial velocity of the movable clutch element will be reduced before it contacts the other clutch element. Under such conditions, the teeth will contact each other but, because of the reduced axial velocity of the movable clutch element, there will be little or no tendency for same to rebound away from each other. Likewise, because of the reduced axial velocity of the movable clutch element, the premature engagement of the clutch elements will be effectively prevented. The clutch elements are then brought into synchronism by external control, such as by the operator controlling the speed of the engine, and when they reach substantial synchronism, the shift is completed by the applied shifting force. This requires only very simple apparatus and is effective even under very high rates of change of relative speeds on the part of the clutch elements with respect to each other.

Accordingly, the objects of the invention include:
(1) To provide mesh assisting means for a pair of interengageable toothed elements which are subject to very high rates of change of relative speeds with respect to each other.

(2) To provide apparatus as aforesaid wherein the relative axial velocity of the interengageable toothed elements is reduced just before they are brought into contact in order to prevent premature clutch engagement or bouncing of the clutch elements off each other.

(3) To provide apparatus as aforesaid which is of extremely simple nature whereby to minimize each and all of the initial manufacturing costs, installation costs and subsequent maintenance costs.

(4) To provide apparatus as aforesaid which will be completely reliable under a wide range of operating circumstances.

(5) To provide apparatus as aforesaid which can readily be applied to existing transmission designs with a minimum of inconvenience, design effort, and additional equipment.

(6) To provide apparatus as aforesaid wherein such additional equipment as is required is of simple and readily understandable nature so that it can be easily and inexpensively applied to existing designs and so that it can be readily serviced and maintained in good operating condition by mechanics accustomed to existing power shifting transmissions.

Other objects and purposes of the invention will be apparent upon a reading of the following specification and an examination of the accompanying drawings.

In the drawings:

FIGURE 1 is an end view of that portion of a transmission structure carrying a shift rod and equipped with the apparatus of the present invention.

FIGURE 2 is a section taken on the line II—II of FIGURE 1 and showing a typical embodiment of the invention.

FIGURE 3 is a sectional view similar to FIGURE 2 of a modification.

*General description*

In general the invention consists of providing a fluid check, somewhat of the nature of a dashpot, ahead of the point at which the interengageable teeth come into end-abutting-end contact with each other. The approach of said teeth toward each other is thus slowed down before they actually contact each other so that no sudden strong impact of tooth faces against each other is possible and rebounding of said teeth away from each other is thereby eliminated. Likewise, the axial velocity of the movable clutch element is reduced to such a value that premature, out-of-synchronism meshing engagement of the clutch teeth is not possible. The shifting force is reapplied just before the teeth abut against each other but because the teeth are being moved from virtually a standstill and because there is only a small distance between the teeth, the axially movable teeth only lightly contact the other teeth. The teeth are then permitted to ratchet against each other until they are substantially synchronized. When this occurs and since the shifting force is already being applied, the shift is completed quickly.

*Detailed description*

Considering now the invention in more detail, as indicated in FIGURE 1 the upper portion of a transmission housing 1 carries standard shift rods and has a cylinder 2 at the end of each of such shift rods for actuating same. Inasmuch as all of the shift rods of a given transmission may be actuated similarly, the illustration and description of a single one thereof will be sufficient to constitute a full disclosure of the invention.

Turning now to FIGURE 2 there is shown at 3 a shift rod carrying the usual shift fork 4 which operates within the usual groove 6 of the movable part, or slider, 7 of a jaw clutch.

In this embodiment the jaw clutch structure is indicated as associated with gears 8 and 10 and the purpose of said clutch is to connect one or the other of said gears to the shaft 9 through the slider 7 and the splines 11 in a conventional manner.

The interengaging teeth of the jaw clutch are shown as sharply slanted, preferably slanted within an angle of 30 degrees to 40 degrees with respect to the rotational axis of the shaft 9 in the manner and for the purposes set forth in the application of Robert C. Russell, Ser. No. 160,033, now Patent No. 3,265,173, as well as for the further purposes set forth hereinafter.

Returning now to the shift rod 3, the end thereof appearing at the rightward portion of FIGURE 2 is enlarged to provide the piston faces 13 and 14. Said piston structure is enclosed within a suitable cylinder bore 16 contained within a casing 17. An opening 18 appears at one end of said bore 16 for the admission of pressure fluid into the rightward of said cylinder bore and an opening 19 cooperates with a passageway 20 for introducing pressure fluid into the opposite or leftward end of said cylinder bore 16.

At any convenient point along said piston rod, here at a point intermediate the two piston faces 13 and 14, there is provided the check means above referred to. In this embodiment said check means consists of a groove 21 provided within said rod, said groove here being provided by the reduction in diameter of the rod shortly to the rightward of the piston face 13 and the addition thereto of the sleeve 22 held in place by snap rings 23 and 24. A partition 26 extends from the surrounding wall of the cylinder bore 16 into said groove to a point closely adjacent the bottom 27 of said groove. In this embodiment, said partition comprises a ring received against a shoulder 28 and held in place by the projection 29 on the end cap portion 31 of the casing structure. Circumferentially spaced, here diametric, passageways 32 and 33 are provided in the bottom 27 of the groove and substantially longitudinally overlapping each other as shown. The extent of such overlapping of the grooves, together with their positioning with respect to the rest of the apparatus, will be described further hereinafter.

A hydraulic fluid reservoir 34 is provided adjacent the cylinder bore 16 and has a passageway 36 extending therefrom through a wall of the cylinder bore 16 at such a point that it will communicate with the groove 21 in the full rightward position of the shift rod 3. Said reservoir 34 has a further passageway 37 communicating through the wall of the cylinder bore 16 in such position that it will communicate with said groove 21 in the full leftward position of the shift rod 3. An opening 38 is provided into the reservoir 34 and a fitting 39 which includes a check valve is applied thereto by which air is permitted to escape from the reservoir but entry of air into the reservoir is blocked.

As shown, the face of the side 7A of the slider 7 approaches close to, but is not yet touching, the portion 8A of the gear 8 which it is to engage, the leftward end 32A of the groove 32 approaches close to a condition of communication with the leftward portion 21A of the groove 21 but is in fact blocked from such communication by the leftward edge of the partition 26. Similarly, when the rightward side 7B of the slider 7 approaches close to, but is not quite in contact with, the portion 10A of the gear 10 with which it interengages, the rightward end 33A of the groove 33 approaches close to communication with the rightward part 21B of the groove 21 but is in fact blocked from actual communication therewith by the partition 26. Further constructional details in this connection are more conveniently described in connection with the operation of the apparatus and hence reference is made thereto.

*Operation*

In considering the operation of the particular form of the invention illustrated in the drawings, it should first be remembered, as fully set forth in the above-mentioned Patent No. 3,265,173, that the conical shapt of the interengaging teeth between the slider 7 and the gears 8 and 10 provide some synchronizing action as same come into contact with each other. Thus, when a shift is to be made, pressure fluid is supplied at the port 18 for example (either overcoming a constant pressure applied at the port 19 or simultaneously with the withdrawal of pressure or with the diminishing of pressure at the port 19) such pressure will act on the piston surface 14 to urge the rod 3 leftwardly. As said rod moves leftwardly, hydraulic fluid within the portion 21B of the groove 21 will flow through the passageway 33 into the chamber 21A. However, when the clutch slider 7 reaches neutral as shown in FIGURE 2, both the leftward end 32A of passageway 32 and the rightward end 33A of the groove 33 encounter the partition 26, flow of the fluid from portion 21B into portion 21A is restricted and the free movement of the rod 3 leftwardly is checked. Said movement is not, however, fully stopped so that the rod continues to move at a slow rate. Just before the teeth 7A of slider 7 contact the jaw teeth 8A the leftward end 32A of the passageway 32 will pass the partition 26 and the passageway 32 will be placed in communication with portions 21A and 21B so that the checking force is removed and the shifting force again becomes effective. When the teeth 7A of the slider 7 are urged into contact with the jaw teeth 8A of the gear 8 by the shifting force, said teeth will ratchet against each other until synchronism is reached and they will move into interengagement with each other. The rod 3 now moves freely leftwardly under the pressure still applied to the piston face 14 and the interengagement of the jaw clutch teeth is completed.

On the rightward movement of the rod 3, the rod moves freely with liquid flowing from the chamber 21A through the passageway 32 into the chamber 21B until the leftward end 32A of the passageway 32 encounters the partition 26. The rightward movement is then checked as previously when the slider reaches neutral. Rightward movement of the rod 3 then continues, and the end 33A of the groove 33 passes the partition 26 just before the teeth 7B encounter the jaw clutch teeth 10A of the gear 10 so that the checking force is removed. The teeth contact each other under force but while moving slowly enough not to cause rebounding or premature engagement, the same become synchronized and interengage when synchronism occurs.

While in the foregoing-described embodiment the interengaging jaw clutch teeth are themselves provided with synchronizing capabilities, it will be recognized that the broader principles of the invention can also be applied to a jaw clutch whose teeth are cut at a steeper angle to the rotational axis thereof including perpendicular thereto if same can be permitted to ratchet against each other or if the unit is provided with other suitable blocker or synchronizing means. It is in all cases, however, necessary that the grooves 32 and 33 be coordinated with the interengaging faces of the jaw clutch teeth so that same are initially checked before they contact each other, are then permitted to contact each other while moving slowly but while under the shifting force and after synchronization the shift is completed rapidly. Thus, the shifting of the slider out of one clutched condition is carried out rapidly under the fluid pressure shifting force. Then the axial velocity of the slider is slowed when the slider reaches neutral. When the slider teeth are close to the teeth of the other clutch part, the power shifting force is reapplied but since the slider is now moving slowly and moves only a short distance before it strikes the teeth of the other clutch part, premature engagement or rebounding of the teeth does not occur. When synchronism occurs, the slider is quickly moved into its other clutched condition by the power shifting force.

*Modification*

An alternative form of the invention is shown in FIGURE 3 wherein the same procedure is carried out but the check means is provided separately from the shift rod instead of being built integrally thereinto as in the form of FIGURES 1 and 2. Here the shift rod 3A is provided with piston faces 13A and 14A for urging same rightwardly or leftwardly according to the pressure differential appearing on said piston faces. Check means 41 are provided adjacent the means supporting and guiding the rod 3A and here consist of means providing cylinders 42 and 43, here coaxially arranged, said cylinders receiving pistons 44 and 46, respectively. Said pistons are connected to each other and to an arm 47 which is connected rigidly to the rod 3A. A passageway 48 connects a chamber 42A of the cylinder 42 to the central reservoir 51 when so permitted by the piston 44 and a passageway 52 connects the chamber 43A to said central reservoir 51 when so permitted by the piston 46.

Thus with the rod 3A in its full rightward position and the piston 46 in the position indicated at 46A, leftward movement is permitted freely until the leading edge of the piston 44 reaches the adjacent edge of the cylinder 42. Said motion is then slowed until said piston passes fully into registry with passageway 48 and the piston 46 passes fully out of the cylinder 43. Free movement then resumes in the same manner for the same purpose as above described in connection with FIGURES 1 and 2. A reverse operation occurs when the rod 3A moves rightwardly and same will be readily understood without further description upon inspection of the drawings in the light of the description thus far provided.

While particular embodiments of the invention have been illustrated and described above for the purpose of setting forth particular examples of the invention, it will be understood that these embodiments are only examples and that said invention may be embodied in a variety of other constructions within the scope of the hereinafter appended claims.

The embodiments of the invention in which an exclusive property or privilege is claimed are defined as follows:

1. For assisting the meshing of a pair of fluid power shifted interengageable jaw clutch teeth, the combination comprising:
   fluid check means positively resisting the movement, in response to said fluid power shifting, of said jaw clutch teeth toward each other without affecting the fluid power applied to said jaw clutch teeth, said resisting occurring at a point ahead of, but close to, the point of actual face-to-face contact of said jaw clutch teeth with respect to each other while permitting same to continue approaching each other; and
   means de-activating said fluid check means for permitting the resumption of free powered movement of said teeth into engagement with each other.

2. For assisting the meshing of a pair of fluid power shifting interengageable jaw clutch teeth, the combination comprising:
   fluid check means positively resisting the movement, in response to said fluid power shifting, of said jaw clutch teeth toward each other without affecting the fluid power applied to said jaw clutch teeth, said resisting occurring at a point ahead of, but close to, the point of actual face-to-face contact of said jaw clutch teeth with respect to each other while permitting same to continue approaching each other;
   means synchronizing said jaw clutch teeth and means de-activating said fluid check means just before interengagement of said teeth with respect to each other for permitting the resumption of free powered movement of said teeth into interengagement with each other.

3. Change speed apparatus comprising in combination:
   a pair of shiftable jaw clutches having respectively interengageable teeth;

fluid power actuated jaw clutch shifting means for moving said jaw clutches toward and away from each other for effecting engagement and disengagement of said teeth;

fluid check means positively resisting the movement, in response to said fluid power shifting, of said jaw clutch teeth toward each other without affecting the fluid power applied to said shifting means, said resisting occurring at a point ahead of, but close to, the point of actual face-to-face contact of said jaw clutch teeth with respect to each other while permitting same to continue approaching each other; and means de-activating said fluid check means for permitting the resumption of free powered movement of said teeth into interengagement with each other.

4. The device defined in claim 3, wherein the facing edges of said jaw clutch teeth are substantially parallel with respect to each other and positioned at an angle of between about 30 degrees and about 40 degrees to the rotative axis thereof.

5. An apparatus for effecting the interengagement of jaw clutch teeth, comprising:

power means applying a resilient force onto one set of jaw clutch teeth for urging same toward the other set thereof;

a pair of fluid chambers having fluid therein and passageway means effecting free movement of said fluid from one chamber to the other as said jaw clutch teeth are caused to move toward each other;

check means appreciably slowing the movement of fluid from one of said chambers to the other thereof as said jaw clutch teeth approach close to each other but prior to actual contact therebetween while permitting continued but slower movement of said jaw clutch toward each other;

means de-activating said check means for permitting resumed free movement of fluid from said one chamber to the other thereof just before said teeth become interengaged whereupon said power means may uninhibitedly complete interengagement of said teeth.

6. The device defined in claim 5 including a central reservoir and wherein said fluid chambers are spaced from each other and in communication with said central reservoir, wherein said passageway means each communicate respectively from one of said fluid chambers to said central reservoir and wherein said check means include a pair of pistons located respectively in each of said chambers, said pistons being arranged respectively to block communication between said passageways and said central reservoir as said jaw clutch teeth approach close to each other but prior to actual contact therebetween and said pistons being further arranged to unblock such communication just before said jaw clutch teeth commence interengagement, and means connecting said pistons to each other and to said one set of jaw clutch teeth.

7. A means for shifting jaw clutch teeth and assisting the intermeshing thereof comprising:

a shift rod for effecting the interengagement of said jaw clutch teeth and continuously acting power means for urging movement of said shift rod;

means defining a pair of chambers surrounding said shift rod and a partition therebetween;

passageways movable with said shift rod and positioned for alternate connection of said chambers and for the substantial but not complete blocking of both thereof by said partition at a point in the movement of said shift rod corresponding to incipient interengagement of said jaw clutch teeth;

whereby movement of said jaw clutch teeth toward each other is checked before the point of contacting between said teeth and said movement is then resumed.

8. The device defined in claim 7 wherein said passageways comprise two passageways in said shift rod and same are circumferentially spaced from each other.

9. The device defined in claim 7 wherein said passageways are formed in said shift rod, are circumferentially spaced from each other and both thereof are blocked by said partition in the neutral position of said jaw clutch teeth.

10. The device defined in claim 7 wherein said passageways are symmetrically arranged longitudinally of said shift rod in order to provide a similar checking effect in each direction of shifting movement, whereby to provide the desired meshing assistance for a double ended slider engageable with jaw clutch members adjacent each end thereof.

11. A device defined in claim 7 wherein said passageways have identical lengths.

12. The device defined in claim 7 wherein said passageways have identical cross-sectional areas.

References Cited

UNITED STATES PATENTS

| | | | |
|---|---|---|---|
| 2,175,152 | 10/1939 | Hey | 192—87.19 XR |
| 843,076 | 2/1907 | Detrick | 192—87.19 |
| 1,686,827 | 10/1928 | Maag | 192—86 XR |
| 2,356,598 | 8/1944 | Lang et al. | 192—86 XR |
| 3,265,173 | 8/1966 | Russell | 192—108 XR |

CARLTON R. CROYLE, *Primary Examiner.*

ALLAN D. HERRMANN, *Assistant Examiner.*

U.S. Cl. X.R.

192—86, 87.19